(12) United States Patent
Carnevali

(10) Patent No.: US 7,571,522 B2
(45) Date of Patent: *Aug. 11, 2009

(54) QUICK DRAW CRADLE APPARATUS

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 370 days.

This patent is subject to a terminal disclaimer.

(21) Appl. No.: 11/191,549

(22) Filed: Jul. 28, 2005

(65) Prior Publication Data

US 2005/0257352 A1   Nov. 24, 2005

(51) Int. Cl.
*A45F 5/00* (2006.01)
(52) U.S. Cl. .................. 24/523; 24/3.1; 24/3.7
(58) Field of Classification Search ............ 24/3.1, 24/3.7, 3.8, 3.11, 3.12, 522, 523; 224/242, 224/445, 662; 248/188.5, 297.11, 297.31, 248/309.1, 313, 314, 316.1, 316.4; 269/156, 269/165, 254 CS, 254 R; 379/426, 446, 454, 379/455
See application file for complete search history.

(56) References Cited

U.S. PATENT DOCUMENTS

| | | | |
|---|---|---|---|
| 2,319,377 A | 5/1943 | Wallace et al. | |
| 2,733,492 A | 2/1956 | Copell | |
| 3,509,882 A * | 5/1970 | Blake | 606/142 |
| 4,066,231 A | 1/1978 | Bahner et al. | |
| 4,118,003 A | 10/1978 | Dillow | |
| 4,798,294 A | 1/1989 | Bodi | |
| 4,802,708 A | 2/1989 | Vos et al. | |
| 4,803,759 A | 2/1989 | Kemble | |
| 4,928,916 A | 5/1990 | Molloy | |
| 4,957,264 A | 9/1990 | Hakanen | |
| 4,976,721 A | 12/1990 | Blasnik et al. | |
| 5,024,408 A | 6/1991 | Magee | |
| 5,149,032 A | 9/1992 | Jones et al. | |
| 5,457,745 A | 10/1995 | Wang | |
| 5,582,377 A | 12/1996 | Quesada | |
| D377,798 S | 2/1997 | Heine | |
| 5,653,414 A | 8/1997 | Chimel | |
| 5,673,628 A | 10/1997 | Boos | |
| 5,685,732 A * | 11/1997 | Lane | 439/369 |
| D390,849 S | 2/1998 | Richter et al. | |
| 5,788,202 A | 8/1998 | Richter | |
| 5,793,614 A | 8/1998 | Tollbom | |
| 5,845,885 A | 12/1998 | Carnevali | |
| 5,903,645 A | 5/1999 | Tsay | |
| 5,917,907 A | 6/1999 | Kela | |
| 6,032,337 A | 3/2000 | Rankin et al. | |

(Continued)

*Primary Examiner*—Robert J Sandy
*Assistant Examiner*—Ruth C Rodriguez
(74) *Attorney, Agent, or Firm*—Charles J. Rupnick

(57) ABSTRACT

A universal cradle apparatus having a pair of substantially rigid jaw structures each configured with a flange structure having a substantially planar mounting surface adapted for being secured to respective cooperating male and female portions of a spring-return clamping mechanism formed of telescoping male linear drive shaft and mating female linear drive channel. The two jaw structures are each configured with a shallow cup-shaped clamping surface that is projected above the respective flange structure. The jaw structures are mounted on the respective drive shaft and drive channel each having its respective cup-shaped interior clamping surface facing toward the clamping surface of the other jaw. A spring is coupled for biasing the male drive shaft into the mating female drive channel of the clamping mechanism, thereby driving the two jaw structures together along a linear drive axis of the clamping mechanism.

20 Claims, 3 Drawing Sheets

U.S. PATENT DOCUMENTS

| | | |
|---|---|---|
| 6,076,790 A | 6/2000 | Richter |
| 6,095,470 A | 8/2000 | Kalis |
| 6,173,933 B1 | 1/2001 | Whiteside et al. |
| 6,213,438 B1 | 4/2001 | Ostby et al. |
| 6,229,893 B1 | 5/2001 | Chen |
| 6,370,741 B1 * | 4/2002 | Lu .................. 24/523 |
| 6,427,959 B1 | 8/2002 | Kalis et al. |
| 6,600,827 B2 | 7/2003 | Lu |
| 6,647,248 B1 | 11/2003 | Ortscheid et al. |
| 6,785,567 B2 | 8/2004 | Kato |
| 6,802,848 B2 | 10/2004 | Anderson et al. |
| 6,814,377 B2 | 11/2004 | Silverman et al. |
| 6,817,587 B2 | 11/2004 | Lin |
| 6,966,533 B1 * | 11/2005 | Kalis et al. .......... 248/316.4 |
| 7,017,243 B2 * | 3/2006 | Carnevali .................. 24/523 |
| 7,032,872 B2 | 4/2006 | Sullivan |
| 2004/0022388 A1 | 2/2004 | Chan et al. |

\* cited by examiner

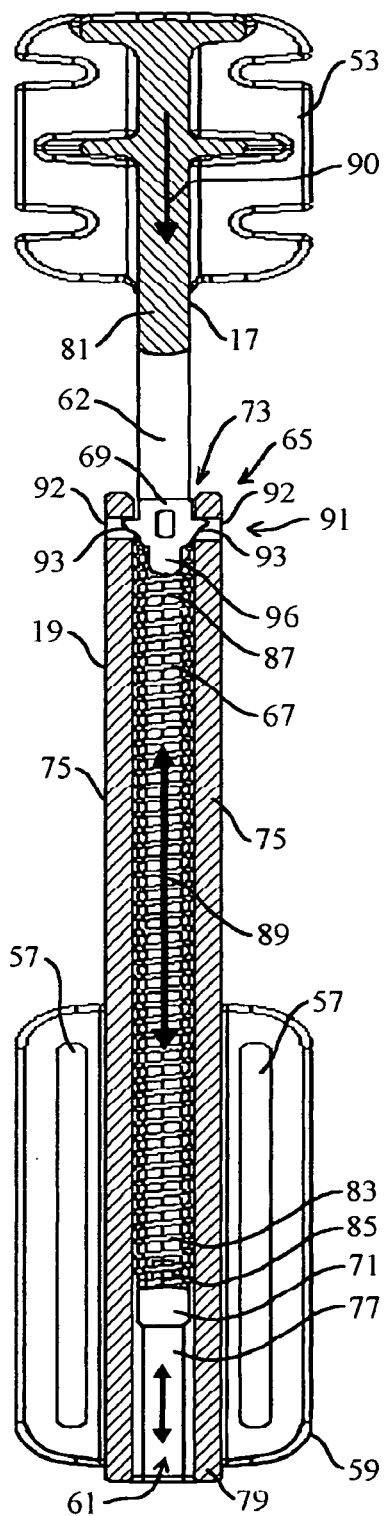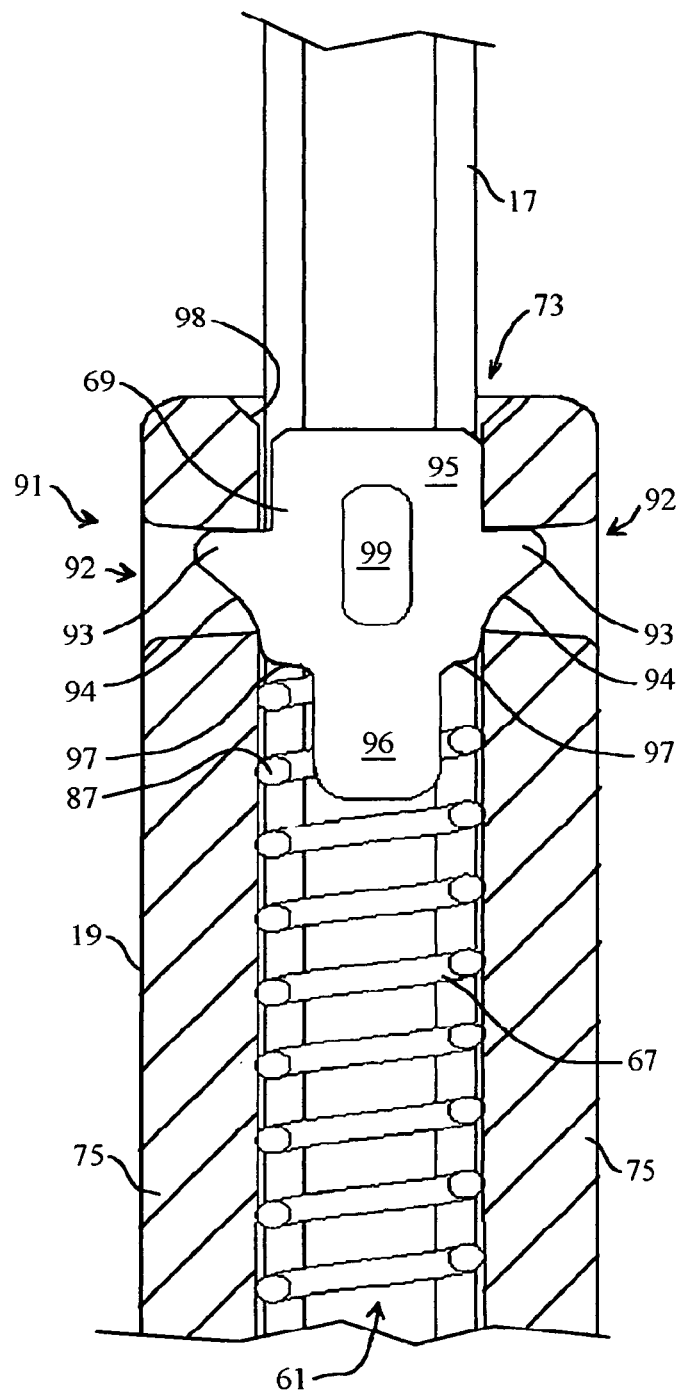
FIG. 3
FIG. 4 ed States Patent

QUICK DRAW CRADLE APPARATUS

RELATED APPLICATIONS

The present application is related to and claims benefit of U.S. patent application Ser. No. 10/636,058 filed in the name of the inventor of the present application on Aug. 7, 2003 and now issued as U.S. Pat. No. 7,017,243, the complete disclosure of which is incorporated herein by reference, and co-pending U.S. patent application Ser. No. 11/136,797 filed in the name of the inventor of the present application on May 24, 2005, the complete disclosure of which is also incorporated herein by reference.

FIELD OF THE INVENTION

The present invention relates to a releasable cradle mounting apparatus, and in particular to spring-return mounting apparatuses for securely releasably cradling personal and other small or hand-held devices.

BACKGROUND OF THE INVENTION

Mounting platforms are generally well-known for securely cradling and even electrically interfacing hand-held pocket-sized personal computers, commonly referred to as "pocket PCs," bar code scanners, and other substantially mobile electronic devices, such as cellular telephones, mobile global positioning system (GPS) receivers, Personal Digital Accessories (PDAs), handle-held personal computers and the like.

One such mounting platform is presented in U.S. Pat. No. 6,427,959, entitled MOUNTING BRACKET FOR AN ELECTRONIC DEVICE, issued Aug. 6, 2002, to Kalis, et al., which is incorporated herein by reference, which includes a cradle adapted for being releasably secured to the electronic device and also includes a support adapted for being mounted to a surface. The cradle is adapted to move along its longitudinal axis relative to an electrical connector that is slidably connected to the cradle. A user can fix the position of the cradle relative to the mounting surface by means of a pin and locking mechanism on the back of the cradle to the support.

Other mounting platforms are also currently known. However, current mounting platforms may be inefficient for effectively securely releasably cradling larger and irregularly shaped devices. Additionally, current mounting platforms are generally application specific and fail to provide truly universal cradling.

SUMMARY OF THE INVENTION

The present invention is a universal cradle apparatus that overcomes known limitations of prior art apparatus for securing an array of different hand-held or personal devices by providing a spring-return clamping mechanism that permits such hand-held or personal devices to be easily and securely cradled, while permitting quick drawing and easy removal of the device.

According to one aspect of the invention, the universal cradle apparatus of the present invention for securely cradling a hand-held or personal device in releasable manner is embodied by example and without limitation as a pair of substantially rigid jaw structures each configured with a base plate having a substantially planar mounting surface adapted to secured to cooperating male and female portions of a spring-return clamping mechanism formed of telescoping male linear drive shaft and mating female linear drive channel. A spring is coupled for biasing the male drive shaft into the mating female drive channel of the clamping mechanism, thereby driving the two jaw structures together along a drive axis of the clamping mechanism.

According to another aspect of the invention, one or both of the jaw structures are further adjustable on the respective drive shaft and drive channel relative to a drive axis of the clamping mechanism.

According to another aspect of the invention, either the male drive shaft or the female drive channel is relatively stationary relative to the cooperating member of the spring-return clamping mechanism, the relatively stationary member being formed with a substantially rigid base plate structured for being secured to an external mounting surface, such as a mounting plate of an external support structure, such as the ball-and-socket support structure disclosed by the inventor of the present invention in U.S. Pat. No. 5,845,885.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a section view through an expandably contractible spring-return clamping mechanism of the releasably-clamped universal cradle apparatus of the invention; and FIG. 4 is a close-up that illustrates one locking mechanism of the spring-return clamping mechanism of the invention.

DETAILED DESCRIPTION OF PREFERRED EMBODIMENT

In the Figures, like numerals indicate like elements.

The universal cradle apparatus of the present invention is embodied by example and without limitation as a pair of substantially rigid jaw structures each configured with a flange structure having a substantially planar mounting surface adapted for being secured to respective cooperating male and female portions of a spring-return clamping mechanism formed of telescoping male linear drive shaft and mating female linear drive channel. The two jaw structures are each configured with a shallow cup-shaped clamping surface that is projected above the respective flange structure. The jaw structures are mounted on the respective drive shaft and drive channel each having its respective cup-shaped interior clamping surface facing toward the clamping surface of the other jaw. A spring is coupled for biasing the male drive shaft into the mating female drive channel of the clamping mechanism, thereby driving the two jaw structures together along a linear drive axis of the clamping mechanism.

The spring-return clamping mechanism includes the telescoping male linear drive shaft and mating female linear drive channel each having one of the jaw structures coupled adjacent to one end thereof. By example and without limitation, the drive shaft is structured with a T-shape that is sized to be movable within a mating hollow T-shaped drive channel that is structured along the drive axis. By example and without limitation, a compression spring is constrained within the drive channel between a foot portion of the drive shaft distal from its jaw and a locking key that is coupled within the drive channel adjacent to an opening thereinto that is distal from its jaw.

Figure 1:
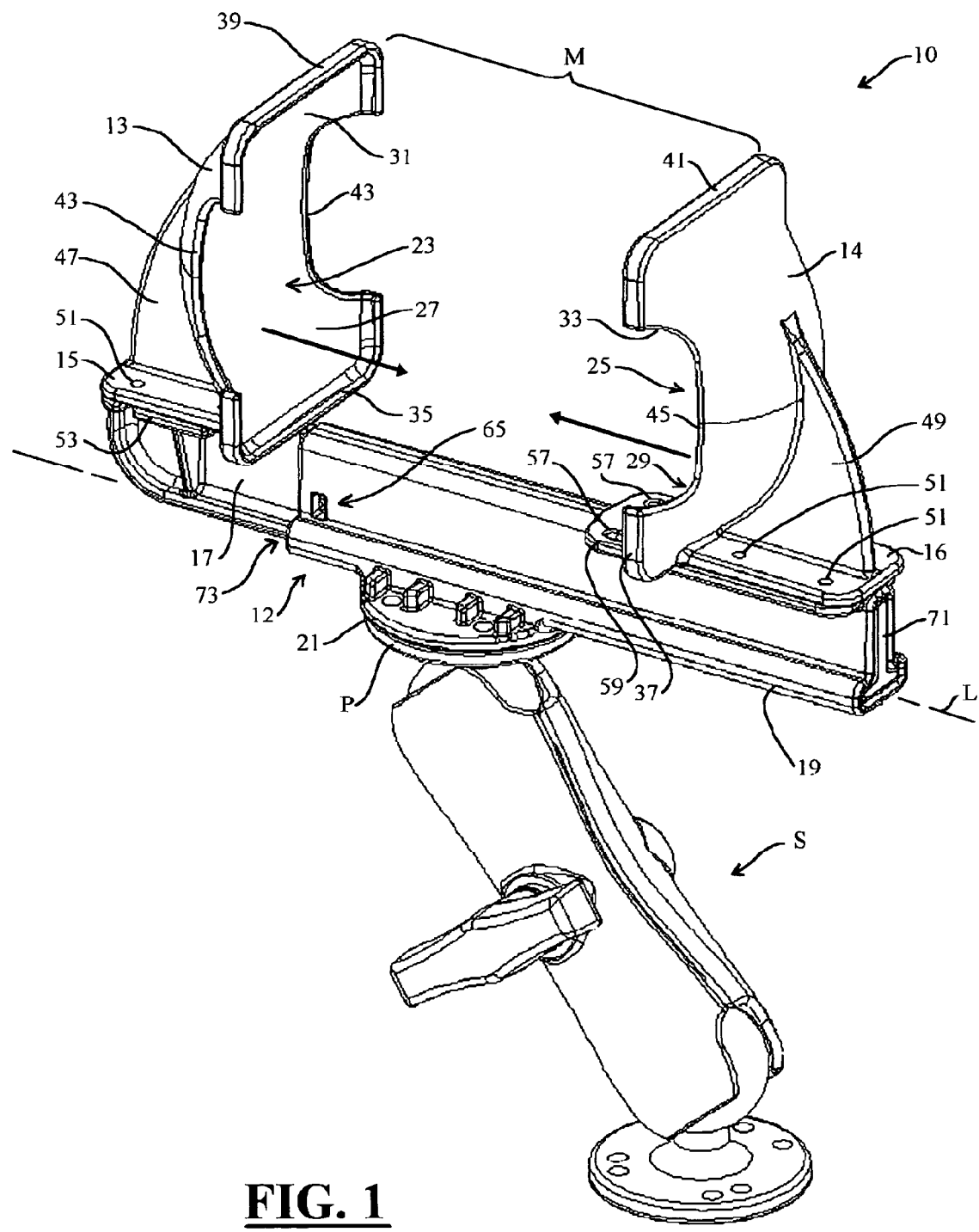
FIG. 1 is a perspective view that illustrates the present invention embodied as a releasably-clamped universal mounting apparatus for securely receiving a large or irregularly shaped device.

FIG. 1 is a perspective view that illustrates the apparatus of the present invention embodied as a releasably-clamped universal cradle apparatus 10 that is structured for securely receiving different larger or irregularly shaped devices. The apparatus 10 is structured with a spring-return clamping mechanism, shown generally at 12, arranged relative to a pair of opposing jaw structures 13, 14 that are structured to cooperate for securely releasably cradling different larger or irregularly shaped devices. The jaw structures 13, 14 are each formed of a respective base flange 15, 16 that is structured for coupling to one of an elongated male drive shaft 17 and a mating elongated female drive frame 19 of the spring-return clamping mechanism 12. The spring-return clamping mechanism 12 is integrated with the jaw structures 13, 14 in an expandably contractible assembly structured for elastically urging the movable drive shaft-mounted jaw 13 against the relatively stationary drive frame-mounted jaw 14, as indicated by the arrows.

Each of the jaw structures 13, 14 and the male drive shaft 17 and mating female drive frame 19 of the spring-return clamping mechanism 12 are optionally individually integrally formed of a substantially rigid and resilient material, such as a rigid metal, plastic or composite material for making the cradle apparatus 10 of the invention substantially rigid and resilient.

Either the male drive shaft 17 or the female drive frame 19 (shown) is further structured to be substantially stationary relative to the other mating member of the spring-return clamping mechanism 12. By example and without limitation, the relatively stationary member (shown as female drive frame 19) is formed with a substantially rigid base plate 21 that is structured for being secured to an external mounting surface, such as a mounting plate P of an external support structure S, such as the ball-and-socket support structure disclosed by the inventor of the present invention in U.S. Pat. No. 5,845,885, UNIVERSALLY POSITIONBLE MOUNTING DEVICE, issued to the inventor of the present invention on Dec. 8, 1998, which is incorporated in its entirety herein by reference.

As is generally well-known, pocket PCs, bar code scanners, and other mobile electronic devices of the type which are intended to be supported by the apparatus 10 of the invention typically include operational controls and an information viewing or display screen located either on different faces or on a single face. Some devices, such as some bar code scanners, also include handles for gripping by the user. Aspects of the apparatus 10 of the invention are therefore structured to expose as much as possible of the faces and gripping handles of the device to the user, including the facial operational controls and display screen. For example, according to the embodiment illustrated herein, the jaw structures 13, 14 are each configured with a respective shallow generally cup-shaped interior clamping surface 23, 25 that is projected above the base plate 21 and clamping mechanism 12. The interior clamping surfaces 23, 25 of the respective jaw structures 13, 14 are generally structured for positively engaging opposite ends of such a device that is inserted therebetween. The jaw structures 13, 14 are mounted on the respective male drive shaft 17 and mating female drive frame 19, each having its respective cup-shaped interior clamping surface 23, 25 facing toward the interior clamping surface of the opposing jaw structure.

The spring-return clamping mechanism 12 drives the jaw structures 13, 14 expandably together substantially along a common longitudinal drive axis L of the mating male drive shaft 17 and female drive frame 19 for forming a mouth opening M of variable length between the opposing clamping surfaces 23, 25. The length of the mouth opening M between the opposing clamping surfaces 23, 25 is expanded by forcing apart the movable male drive shaft 17 and relatively stationary female drive frame 19 along the common longitudinal drive axis L as the spring-return clamping mechanism 12 simultaneously urges the jaw structures 13, 14 back together for capturing and securing an inserted device therebetween. By example and without limitation, the male drive shaft 17 is formed as a bar having a cross-legged shape, and the female drive frame 19 is formed having a mating hollow cross-legged shape, such as the T-shape illustrated here. Alternative cross-legged shapes include any convenient shape having at least two crossed legs, including: an F-shape, an I-shape, an L-shape, a U-shape, a V-shape, and an X-shape. The mating cross-legged shapes of the drive shaft 17 and drive frame 19 are not necessary or critical to the invention. However, the mating cross-legged shapes help to resist twisting about the longitudinal drive axis L during operation. The mating cross-legged shapes also help to stiffen the drive shaft 17 and drive frame 19 that form the spine of the cradle apparatus 10 of the invention.

The shallow generally cup-shape of the clamping surface 23, 25 optionally enclose a generally globular shape, but may also enclose a slightly flattened globular shape. The generally globular or slightly flattened shapes of the clamping surface 23, 25 tent to center the inserted device therein as the spring-return clamping mechanism 12 simultaneously urges the jaw structures 13, 14 together. The clamping surfaces 23, 25 alternatively enclose a generally upright egg shape having a slightly deeper flattened cup shape in their respective proximate portions 27, 29 nearer the clamping mechanism 12, and a slightly shallower flattened cup shape at the respective outer or distal portions 31, 33 of the jaw structures 13, 14. The flattened upright egg shape of the clamping surface 23, 25 presses on the inserted device and urges it toward the drive frame 19 as the spring-return clamping mechanism 12 simultaneously urges the jaw structures 13, 14 together.

Each of the respective proximate and distal jaw structure portions 27, 29, 31, 33 optionally includes a respective peripheral lip 35, 37, 39, 41 that stiffen the clamping surface 23, 25, thereby making the apparatus 10 of the invention more effective for holding heavier objects.

Optionally, the jaw structures 13, 14 are optionally formed as respective shallow recesses 43, 45 on opposites sides thereof between their respective proximate and distal portions 27, 29, 31, 33. The recesses 43, 45 may include their own stiffening lips such that the respective peripheral lips 35, 37, 39, 41 form substantially continuous peripheral stiffening lips around the clamping surface 23, 25. Alternatively, the recesses 43, 45 interrupt the respective peripheral lips 35, 37, 39, 41, as illustrated. Optionally, gussets 47, 49 stiffen the respective jaw structures 13, 14 along the common longitudinal drive axis L of the mating male drive shaft 17 and female drive frame 19.

The jaw structures 13, 14 and their respective cup-shaped clamping surface 23, 25 are each optionally substantially symmetric relative to the common longitudinal drive axis L of the clamping mechanism 12. Optionally, the structures 13, 14 are substantially identical, including their respective base flanges 15, 16 and cup-shaped clamping surfaces 23, 25.

One or both of the jaw structures 13, 14 is optionally permanently movable along the respective male drive shaft 17 and female drive frame 19 for permanently adjusting the expansive range of the mouth opening M therebetween. For example, one jaw structure 13 is coupled to the male drive shaft 17 in a fixed position by one or more fasteners 51 coupled between the jaw structure's base flange structure 15 and a mating flange structure 53 on the male drive shaft 17. As illustrated, the fasteners 51 are positioned substantially symmetrically on opposite sides of the jaw structure 13. The other jaw structure 14 is permanently movable along the female drive frame 19 by one or more of the fasteners 51 coupled between the jaw structure's base flange 16 and one or more mating longitudinal slots 57 through a mating flange structure 59 on the female drive frame 19. As illustrated, the longitudinal slots 57 and cooperating fasteners 51 are positioned substantially symmetrically on opposite sides of the jaw structure 14.

Figure 2:
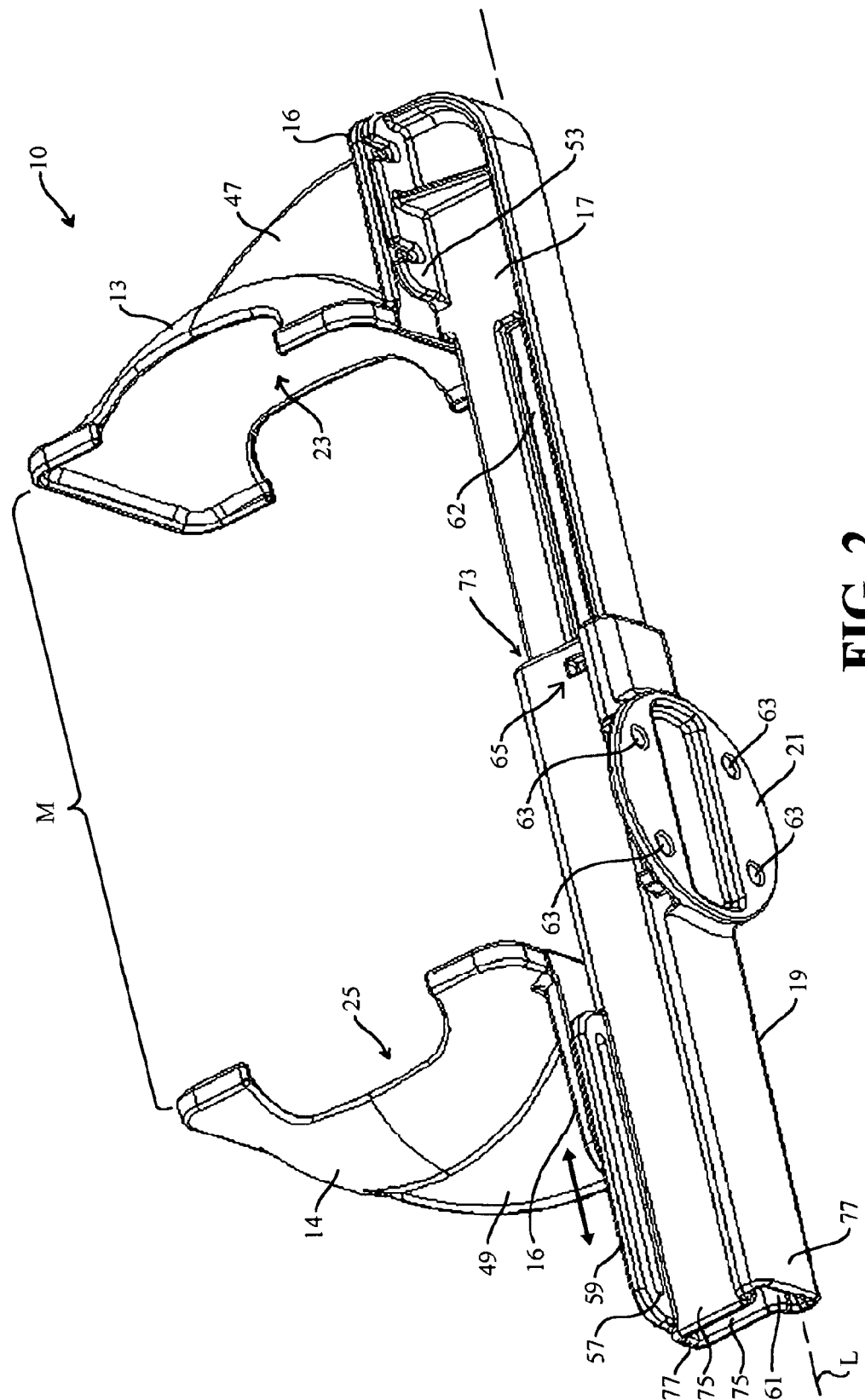
FIG. 2 is a perspective view that illustrates the releasably-clamped universal mounting apparatus of the present invention.

FIG. 2 is a different perspective view that illustrates the releasably-clamped universal cradle apparatus 10 of the present invention. Here, the longitudinal slots 57 are shown as continuous longitudinal slots through the flange 59 on the female drive frame 19 for mating with the slots or holes 55 through the base flange 16 of the jaw structure 14. As illustrated, the mating holes 55 and longitudinal slots 57 permit the base flange 16 of the jaw structure 14 to be moved to different positions along the mating flange 59 on the female drive frame 19, as illustrated by the arrow, by merely loosening and subsequently tightening the fasteners 51 therebetween. The mouth opening M between the jaw structures 13, 14 is thereby temporarily or permanently adjustable along the longitudinal drive axis L for operating in within a different larger or smaller expansive range.

The flange 53 is illustrated as being integrally formed on the bottom of the T-shaped male drive shaft 17 and imparting an I-shape on a portion of the male drive shaft 17 that remains outside the female drive frame 19. The flange 53 thus provides the dual functions of securing the stationary jaw structure 13 and acting as a fixed stop between the male drive shaft 17 and female drive frame 19.

Also shown are the mating and relatively movable T-shapes of the male drive shaft 17 and female drive frame 19. As illustrated here, the female drive frame 19 completely encloses a substantially continuous longitudinal T-shaped female opening or drive channel 61 that extends substantially the entire length of the elongated drive frame 19 and is sized to receive therein the substantially continuous longitudinal T-shape of the elongated male drive shaft 17.

According to one embodiment of the invention, the elongated male drive shaft 17 optionally includes an elongated lengthwise slot 62 formed therein. When present, the elongated lengthwise slot 62 optionally runs substantially the entire length of the elongated male drive shaft 17 from the mating flange structure 53 formed thereon to a foot portion 71 thereof (shown in a subsequent Figure). When present, the elongated lengthwise slot 62 is structured to operate as described herein below.

The relatively stationary female drive frame 19 is illustrated as being integrally formed with the substantially rigid base plate 21 that is structured for being secured to an external mounting surface, such as the mounting plate P of the external support structure S, as illustrated in a previous Figure. For example, the integral base plate 21 extends beyond the female drive frame 19 and is formed with one or more mounting slots or holes 63 structured for receiving suitable fasteners for coupling to the mounting plate P.

FIG. 3 is a section view through the expandably contractible spring-return clamping mechanism 12 of the releasably-clamped universal cradle apparatus 10 with the jaw structures 13, 14 removed for clarity. The spring-return clamping mechanism 12 includes a locking mechanism, shown generally at 65, of the invention for capturing an elastically compressible biasing member 67 between the movable male drive shaft 17 and the relatively stationary female drive frame 19. The locking mechanism 65 of the invention is embodied as a locking key 69 that is combined with both the movable male drive shaft 17 and the relatively stationary female drive frame 19.

By example and without limitation, the male drive shaft 17 is structured to move lengthwise within the drive channel 61 of the relatively stationary female drive frame 19 with the elastically compressible biasing member or compression spring 67 being constrained within the drive channel 61 between the locking key 69 and the foot portion 71 of the drive shaft 17 distal from the I-shaped portion thereof formed by the flange structure 53 holding the jaw structure 13. The locking key 69 is coupled within the drive channel 61 adjacent to an opening 73 thereinto adjacent to one end of the female drive frame 19 whereinto the drive shaft 17 is inserted.

By example and without limitation, the female drive channel 61 is formed with a closed surface having opposing channel walls 75 that are coupled in a spaced-apart manner by a pair of spaced-apart opposing channel spacer walls 77 (one shown) intervening therebetween. As illustrated in one or more other Figures, the intervening spacer walls 77 form the base and cap of the T-shaped female drive frame 19, whereby the female drive channel 61 has a substantially constant cross-sectional interior configuration for substantially its entire length. Although possibly more difficult to manufacture, the female drive channel 61 is optionally closed at its aft end 79 opposite the opening 73 thereinto. As discussed herein, the female drive frame 19 of the spring-return clamping mechanism 12 is optionally individually integrally formed of a substantially rigid and resilient material such that the closed-surface of female drive channel 61 operates as a stiffener to rigidify the female drive frame 19 against both twisting and bending. The spaced-apart channel walls 75 stiffen the female drive frame 19 substantially in the plane of the jaw structures 13, 14, and the spaced-apart base and cap walls 77 stiffen the female drive frame 19 substantially crosswise to the plane of the jaw structures 13, 14.

The elastically compressible biasing member 67, which is illustrated by example and without limitation as a conventional coil-type compression spring of steel or another suitable material, is inserted between the jaw end 81 of the elongated male drive shaft 17 adjacent to the flange structure 53 thereof and its distal foot portion 71. The distal foot portion 71 of the elongated drive shaft 17 is structured to engage and restrain one end 83 of the biasing spring 67. The distal foot portion 71 of the elongated drive shaft 17 optionally includes a tab or nib 85 structured to engage and restrain the end 83 of the biasing spring 67. Although useful for ease of assembly, the tab or nib 85 is not necessary or critical for practicing the invention. As discussed herein above, the elongated drive shaft 17 optionally includes the elongated lengthwise slot 62 formed therein, as best illustrated in FIG. 2. When present, the tab or nib 85 that is structured to engage and restrain the end 83 of the biasing spring 67 is formed in one end of the slot 62 adjacent to the distal foot portion 71 of the elongated drive shaft 17.

After this assembly with biasing spring 67, the elongated male drive shaft 17 is inserted into the closed-surface female drive channel 61. The second foot portion 71 of the elongated male drive shaft 17 is inserted through into the opening 73 and slid toward the opposite aft end 79 of the female drive channel 61. The elongated male drive shaft 17 is thereby slidingly engaged with the female drive channel 61 formed between the spaced-apart channel walls 75 and intervening base and cap walls 77 of the elongated female drive frame 19.

The biasing spring 67 of the clamping mechanism 12 is additionally compressed against the second distal foot portion 71 of the elongated male drive shaft 17 by pressure exerted against a free end 87 of the biasing spring 67. While in a generally relaxed or expanded condition, the free end 87 of the biasing spring 67 is positioned against the distal foot portion 71 of the elongated drive shaft 17 within the closed-surface female drive channel 61. The locking key 69 is installed between the free end 87 of the biasing spring 67 and the aft or jaw end 81 of the drive shaft 17. The biasing spring 67 is thereafter expandably compressed between the locking key 69 and distal foot portion 71 of the movable clamp's elongated drive shaft 17 while the locking key 69 is mechanically coupled to the female drive channel 61 adjacent to its opening 73. The biasing spring 67 thereafter exerts an expanding spring force F, illustrated by the arrow 89, between the locking key 69 and the distal foot portion 71 of the elongated drive shaft 17 that contracts or biases the flange structure 53 holding the jaw structure 13 along the female drive channel 61 toward the flange 59 of the female drive frame 19 holding the other jaw structure 14, as illustrated by the arrow 90. The biasing spring 67 thereby operates to expandably bias the movable jaw structure 13 mounted on the male drive shaft 17 toward the stationary jaw structure 14 mounted on the female drive frame 19 for securing an inserted device between the respective clamping surface 23, 25. The biasing spring 67 is selected having a spring rate sufficient to cause the movable jaw structure 13 to securely cradle the inserted device against the cooperating stationary jaw structure 14.

According to the embodiment of the invention as illustrated here and more clearly illustrated here, at least one, and optionally both (shown), of the opposing channel walls 75 are formed with a cooperating locking structure, shown generally at 91, within the channel walls 75 of the female drive channel 61 portion of the female drive frame 19. By example and without limitation, the cooperating locking structure 91 is formed as a single notch 92 or a pair of opposing notches in the channel walls 75 adjacent to the channel opening 73. The notch or notches 92 are structured to engage mating detents 93 on the locking key 69, whereby the locking key 69 is fixed in locked relationship with the female drive channel 61 portion of the female drive frame 19. Thereafter, the closed-surface female drive channel 61 and the locking key 69 together operate to constrain the biasing member or compression spring 67 such that it spring-loads or "biases" the movable male drive shaft 17 toward the cradle's relatively stationary female drive frame 19 in a retractable or expandable manner. For ease of manufacturing the notches 92 are apertures formed completely through the respective channel walls 75 (shown). The notches 92 are optionally closed indentations formed on opposing interior surfaces of the channel walls 75. The detents 93 engage the opposing notches 92 to fix the locking key 69 in locked relationship with the female drive frame 19 and to capture the compression spring 67 within the female drive channel 61 between the distal foot portion 71 of the movable elongated drive shaft 17 and the opening 73 of the female drive channel 61 distal from the cradle's stationary jaw structure 14.

The locking key 69 is formed of a substantially incompressible material, for example metal or hard plastic, so that the detents 93 are stiff and unyielding. As discussed herein, the closed-surface of female drive channel 61 is formed of a substantially rigid material, such as a metal, rigid plastic or composite material. The channel walls 75 are constructed having a width and thickness calculated to cooperate with the locking key 69 such that one or both of the channel walls 75 flex slightly to admit the locking key 69 therebetween when sufficient pressure is applied to force locking key 69 through the opening 73 into the female drive channel 61.

FIG. 4 is a close-up that illustrates the locking mechanism 65 of the spring-return clamping mechanism 12, wherein the detents 93 of the locking key 69 are each formed with a lead-in 94 for easing entry of the locking key 69 through the opening 73 into the female drive channel 61. The lead-ins 94 are, for example, a bevel or chamfer or a fillet (shown). The opening 73 into the female drive channel 61 may include a lead-in 146 that further eases entry of the locking key 69.

The locking key 69 includes a body 95 that is shaped to cooperate with the interior of the female drive channel 61 and is sized to fit through the opening 73 thereinto and thereafter to become fixed in locked relationship with the notches 92, whereby the opening 73 is blocked. For example, the key body 95 is substantially rectangular in cross-section when the female drive channel 61 is formed with substantially planar walls 75. Optionally, the locking key 69 includes an integral tab or "nose" portion 96 that is structured to engage and capture the free end 87 of the biasing spring 67. In order to engage the biasing spring 67, the nose 96 is formed smaller than the key body 95 so that a shoulder 97 is formed at the intersection. The shoulder 97 provides a rest or stop for supporting the biasing spring 67 in a partly compressed state when the biasing spring 67 is a conventional compression spring wound in a tubular shape along its active longitudinal axis, as illustrated. Thus, the nose 96 is sized to fit inside the tubular spring 67, while the shoulder 97 is sized larger than the outer diameter of the tubular biasing spring 67. The nose 96 thereby provides purchase on the locking key body 95 during assembly that helps to maintain the relative positioning and alignment of the biasing spring 67 with the locking key body 95. Optionally, the nose 96 includes means for securing the biasing spring 67 relative to the locking key 69. For example, the nose 96 is formed with a cross-axis dimension, such as a diameter, sized to be a slight interference fit within the tubular coil-type biasing spring 67.

During assembly the key's nose 96 is fitted into the previously free end 87 of the tubular biasing spring 67. The locking key 69 is then pressed through the channel opening 73 and between the spaced-apart channel walls 75. The key's lead-ins 94 and channel opening's lead-in 146 are used to ease entry of the locking key 69. The channel walls 75 resiliently flex and spread apart to admit the key's detents 93 that extend from the key's body 95. The channel walls 75 continue to flex and spread apart as the key 69 travels along the female drive channel 61. The key's body 95 and nose 96 are further structured to cooperate with the channel walls 75 and the biasing spring 67, respectively, to maintain alignment of the key 69 with the female drive channel 61. When the key 69 is pushed far enough into the female drive channel 61, the key's detents 93 encounter and enter the notches 92 in the channel walls 75. Upon entry of the detents 93 into the cooperating notches 92 the substantially rigid and resiliently flexible spaced-apart opposing channel walls 75 resiliently revert or "snap back" to their natural shape, whereby the key's detents 93 are nested and substantially permanently captured in the cooperating notches 92. The biasing spring 67 is thereby permanently captured within the female drive channel 61 between the distal foot portion 71 of the clamp's elongated drive shaft 17 and the opening 73 into the female drive channel 61 distal from the flange 59 of the female drive frame 19 holding the stationary jaw structure 14.

According to one embodiment of the invention, the key body 95 optionally includes means for easing ejection from a mold, when the key 69 is manufactured by injection molding plastic, or means for controlling the key 69 during assembly. For example, the key body 95 is hollowed by a aperture 99 therethrough either for a mold ejection pin, or an assembly guide pin or other control device.

Other configurations for both the locking key 69 and the cooperating locking structure 91 are also contemplated, as illustrated by reference to either of co-pending U.S. patent application Ser. No. 10/636,058 or co-pending U.S. patent application Ser. No. 11/136,797, both incorporated herein by reference. For example, as disclosed in these co-pending US patent applications, the channel walls 75 of the female drive frame 19 are substantially inflexible, and when sufficient pressure is applied, the locking key 69 flexes slightly to squeeze through the opening 73 into the female drive channel 61 between the substantially inflexible channel walls 75.

While the preferred embodiment of the invention has been illustrated and described, it will be appreciated that various changes can be made therein without departing from the spirit and scope of the invention. Therefore, the inventor makes the following claims.

What is claimed is:

1. A universal cradle apparatus, comprising:
   a telescoping clamping mechanism, comprising:
   (i) a male drive shaft and a mating female drive channel, the female drive channel further comprising a pair of spaced apart walls at least one of the walls having an opening thereinto, and the male drive shaft further comprising a portion thereof sized to be received between the spaced apart walls of the female drive channel,
   (ii) a biasing member positioned between the drive shaft and the spaced apart walls of the drive channel and elastically biasing the drive shaft toward the drive channel substantially along a common axis,
   (iii) a discrete key positioned between the spaced apart walls of the female drive channel and coupled into the opening into the wall, the key constraining the biasing member between the drive shaft and the drive channel, and
   (iv) one of the drive shaft and the drive channel being structured for being secured to an external mounting surface; and
   a pair of substantially rigid jaw structures each being secured to a respective one of the male and female portions of the clamping mechanism, each of the jaw structures projected from a respective one of the drive shaft and drive channel and having mutually opposing interior clamping surfaces arranged therebetween.

2. A universal cradle apparatus, comprising:
   a telescoping clamping mechanism, comprising:
   (i) a male drive shaft and a mating female drive channel, wherein the female linear drive channel further comprises two surfaces that are spaced apart to receive the male linear drive shaft and the biasing member therebetween;
   (ii) a biasing member between the drive shaft and the drive channel for elastically biasing the drive shaft toward the drive channel substantially along a common axis,
   (iii) a locking mechanism structured for constraining the biasing member between the drive shaft and the drive channel, wherein the locking mechanism further comprises a locking key engaging the biasing member and being interlocked with at least one of the two spaced apart surfaces, and one of the locking key and one of the spaced-apart surfaces is structured to resiliently flex for positioning the locking key between the two spaced apart surfaces and is further structured to relax for interlocking the locking key between the two spaced apart surfaces after the locking key is positioned, and
   (iv) one of the drive shaft and the drive channel being structured for being secured to an external mounting surface; and
   a pair of substantially rigid jaw structures each structured for being secured to a respective one of the male and female portions of the clamping mechanism, each of the jaw structures projected from a respective one of the drive shaft and drive channel and having mutually opposing interior clamping surfaces arranged therebetween.

3. The apparatus of claim 2 wherein at least one of the spaced-apart surfaces further comprises a resiliently flexible surface.

4. The apparatus of claim 3 wherein the locking key further comprises a substantially rigid body.

5. The apparatus of claim 2, further comprising adjustable mounting structure between one of the jaw structures and a respective one of the male and female portions of the clamping mechanism.

6. The apparatus of claim 2 wherein the female linear drive channel further comprises a hollow cross-leg shaped channel, and the male drive shaft further comprises a mating cross-leg shaped portion.

7. The apparatus of claim 2 wherein one of the jaw structures further comprises a clamping surface structured to bias an object inserted between the jaw structures toward the clamping mechanism.

8. A universal cradle apparatus, comprising:
   a telescoping clamping mechanism, comprising:
   (i) a female linear drive channel formed of a pair of spaced-apart walls having an opening therebetween, one of the walls being resiliently flexible and one of the walls having a notch formed therein adjacent to the opening,
   (ii) a compression spring sized to fit between the spaced apart walls of the female linear drive channel,
   (iii) a male drive shaft sized to slidingly fit between the spaced-apart walls, the drive shaft having a first jaw adjacent to a first end thereof and a second end thereof being structured for engaging a first end of the spring, and
   (iv) a locking key having a body portion sized to fit between the spaced-apart walls, the body portion having a detent structured to substantially permanently interlock with the notch and to engage a second end of the spring;
   a second jaw positioned on the drive channel and arranged to cooperate with the first jaw; and
   a substantially rigid base plate positioned on the clamping mechanism, the base plate being structured for being coupled to an external surface.

9. A universal cradle apparatus, comprising:
   a telescoping clamping mechanism, comprising:
   (i) a female linear drive channel formed of a pair of spaced-apart resiliently flexible walls having an opening therebetween, one of the walls being resiliently flexible and one of the walls having a notch formed therein adjacent to the opening,
   (ii) a compression spring sized to fit between the spaced apart walls of the female linear drive channel, (iii) a male drive shaft sized to slidingly fit between the spaced-apart walls, the drive shaft having a first jaw adjacent to a first end thereof and a second end thereof being structured for engaging a first end of the spring, and
(iv) a locking key having a body portion sized to fit between the spaced-apart walls, the body portion having a detent structured to substantially permanently interlock with the notch and to engage a second end of the spring;

a second jaw positioned on the drive channel and arranged to cooperate with the first jaw; and a substantially rigid base plate positioned on the clamping mechanism, the base plate being structured for being coupled to an external surface.

10. The apparatus of claim 9 wherein the body portion and detent are further substantially rigid and inflexible.

11. The apparatus of claim 10 wherein the female linear drive channel further comprises a second pair of spaced-apart walls arranged substantially crosswise to a first pair, the second pair of spaced-apart walls having an opening therebetween; and
the male drive shaft further comprises first and second crosswise portions sized to slidingly fit between the respective first and second pairs of spaced-apart walls.

12. The apparatus of claim 11 wherein the first and second pairs of spaced-apart walls are further arranged in a substantially T-shaped formation, and the first and second crosswise portions of the male drive shaft are further arranged in a mating substantially T-shaped formation.

13. The apparatus of claim 9 wherein the opening between the pair of spaced-apart walls further extends therebetween for an entire length of at least one of the walls.

14. A universal cradle apparatus, comprising:
a telescoping clamping mechanism, comprising:
(i) a female linear drive channel formed of a pair of spaced-apart walls having an opening therebetween, one of the walls being resiliently flexible and one of the walls having a notch formed therein adjacent to the opening,
(ii) a compression spring sized to fit between the spaced apart walls of the female linear drive channel,
(iii) a male drive shaft sized to slidingly fit between the spaced-apart walls, the drive shaft having a first jaw adjacent to a first end thereof and a second end thereof being structured for engaging a first end of the spring, and
(iv) a locking key having a body portion sized to fit between the spaced-apart walls, the body portion having a detent structured to substantially permanently interlock with the notch and to engage a second end of the spring;

a second jaw positioned on the drive channel and arranged to cooperate with the first jaw, wherein one of the first jaw and the second jaw is further adjustably positionable relative the respective drive shaft and drive channel; and a substantially rigid base plate positioned on the clamping mechanism, the base plate being structured for being coupled to an external surface.

15. A universal cradle apparatus, comprising:
a telescoping clamping mechanism, comprising:
(i) a frame member forming a substantially rigid T-shaped channel having an opening thereinto formed at a first end thereof and having a substantially rigid but resiliently flexible wall structure that includes at least one notch formed therein adjacent to the opening;
(ii) a substantially rigid bar having an elongated T-shaped drive shaft extending from a first end thereof, the elongated drive shaft being structured to be slidingly received into the T-shaped channel through the opening thereinto and further including a spring engagement structure formed distal from the first end of the bar,
(iii) a locking key having at least one substantially rigid detent projecting from a substantially rigid body portion, the detent being structured to interlock with the notch formed in the T-shaped channel, and
(iv) a compression spring that is sized to be received into the T-shaped channel through the opening thereinto and is further sized to be at least partly compressed when positioned between the locking key and the spring engagement structure of the elongated drive shaft;

a first substantially rigid jaw structure coupled to the bar adjacent to the first end thereof; and a second substantially rigid jaw structure coupled to the frame member.

16. The apparatus of claim 15 wherein the wall structure of the T-shaped channel further comprises a pair of notches formed therein adjacent to the opening and at opposite sides thereof; and
the locking key further comprises a pair of substantially rigid detents projecting from opposite sides of the body portion, the detents being structured to interlock with the pair of notches formed in the T-shaped channel.

17. The apparatus of claim 16 wherein the locking key further comprises a substantially rigid elongated body having a substantially rectangular cross-section, a substantially rectangular shoulder portion formed at a first end of the elongated body, and an integral tab structured to engage one end of the compression spring.

18. A universal cradle apparatus, comprising:
a telescoping clamping mechanism, comprising:
(i) a frame member forming a substantially rigid T-shaped channel having an opening thereinto formed at a first end thereof and having a substantially rigid but resiliently flexible wall structure that includes at least one notch formed therein adjacent to the opening,
(ii) a substantially rigid bar having an elongated T-shaped drive shaft extending from a first end thereof, the elongated drive shaft being structured to be slidingly received into the T-shaped channel through the opening thereinto, wherein the elongated T-shaped drive shaft further comprises an elongated lengthwise slot formed therein and a spring engagement structure formed adjacent one end thereof distal from the first end of the bar,
(iii) a locking key having at least one substantially rigid detent projecting from a substantially rigid body portion, the detent being structured to interlock with the notch formed in the T-shaped channel, and
(iv) a compression spring that is sized to be received into the T-shaped channel through the opening thereinto and is further sized to be at least partly compressed when positioned between the locking key and the spring engagement structure of the elongated drive shaft, the compression spring residing in the lengthwise slot and engaged with the spring engagement structure formed therein;

a first substantially rigid jaw structure coupled to the bar adjacent to the first end thereof; and a second substantially rigid jaw structure coupled to the frame member.

19. The apparatus of claim 15 wherein the first and second jaw structures further comprise respective first and second substantially cup-shaped clamping surfaces, the first and second clamping surfaces arranged in a mutual facing arrangement along a common operational axis of the channel and drive shaft.

20. The apparatus of claim 19 wherein the frame member further comprises a flange structure having a pair of longitudinal slots formed therethrough and arranged substantially along a common operational axis of the channel and drive shaft, and the second jaw structure being positionally adjustable along the slots.

* * * * *